United States Patent
Balan et al.

(10) Patent No.: US 9,042,534 B2
(45) Date of Patent: *May 26, 2015

(54) CALLER NAME IDENTIFICATION USING DATA STRUCTURE SYNCHRONIZATION OF DIFFERENT NETWORKS

(71) Applicant: Cellco Partnership, Arlington, VA (US)

(72) Inventors: Bindu Balan, Basking Ridge, NJ (US); Nishit Oza, North Andover, MA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,842

(22) Filed: Jun. 30, 2014

(65) Prior Publication Data

US 2015/0030145 A1 Jan. 29, 2015

Related U.S. Application Data

(63) Continuation of application No. 13/952,241, filed on Jul. 26, 2013, now Pat. No. 8,787,545.

(51) Int. Cl.
*H04M 3/42* (2006.01)
*H04M 7/00* (2006.01)
*H04W 4/22* (2009.01)

(52) U.S. Cl.
CPC ............ *H04M 3/42042* (2013.01); *H04W 4/22* (2013.01)

(58) Field of Classification Search
USPC ................. 379/93.07, 93.25, 100.05, 100.12, 379/142.01, 142.06, 142.17, 201.01, 379/201.02, 201.08, 207.02, 207.15, 379/220.01, 220.03, 221.11; 455/428, 455/432.3, 415

See application file for complete search history.

(56) References Cited

U.S. PATENT DOCUMENTS

| | | | |
|---|---|---|---|
| 5,862,201 A | 1/1999 | Sands | |
| 5,963,864 A | 10/1999 | O'Neil et al. | |
| 6,922,413 B1 | 7/2005 | Hume et al. | |
| 7,602,901 B1 | 10/2009 | Kates et al. | |
| 8,515,037 B2 | 8/2013 | Ye | |
| 2009/0216725 A1* | 8/2009 | Yaqub | 707/3 |
| 2012/0196580 A1* | 8/2012 | Simmons et al. | 455/415 |
| 2013/0218902 A1* | 8/2013 | Vendrow et al. | 707/748 |
| 2013/0229910 A1 | 9/2013 | McKnight et al. | |

* cited by examiner

*Primary Examiner* — Binh Tieu

(57) ABSTRACT

A device may receive a request to enable service on a wireless network for a user device. The user device may be associated with a wired network. The device may request network provisioning information, associated with the wired network, identifying service activation parameters. The device may provision the wireless network based on the request for network provisioning associated with the wired network. The device may synchronize caller information to a first caller information device, associated with the wireless network, from a second caller information device, associated with the wired network. The caller information may include caller identification information. The device may enable the service for the user device on the wireless network based on provisioning the wireless network and synchronizing the caller information to the first caller information device from the second caller information device.

20 Claims, 11 Drawing Sheets

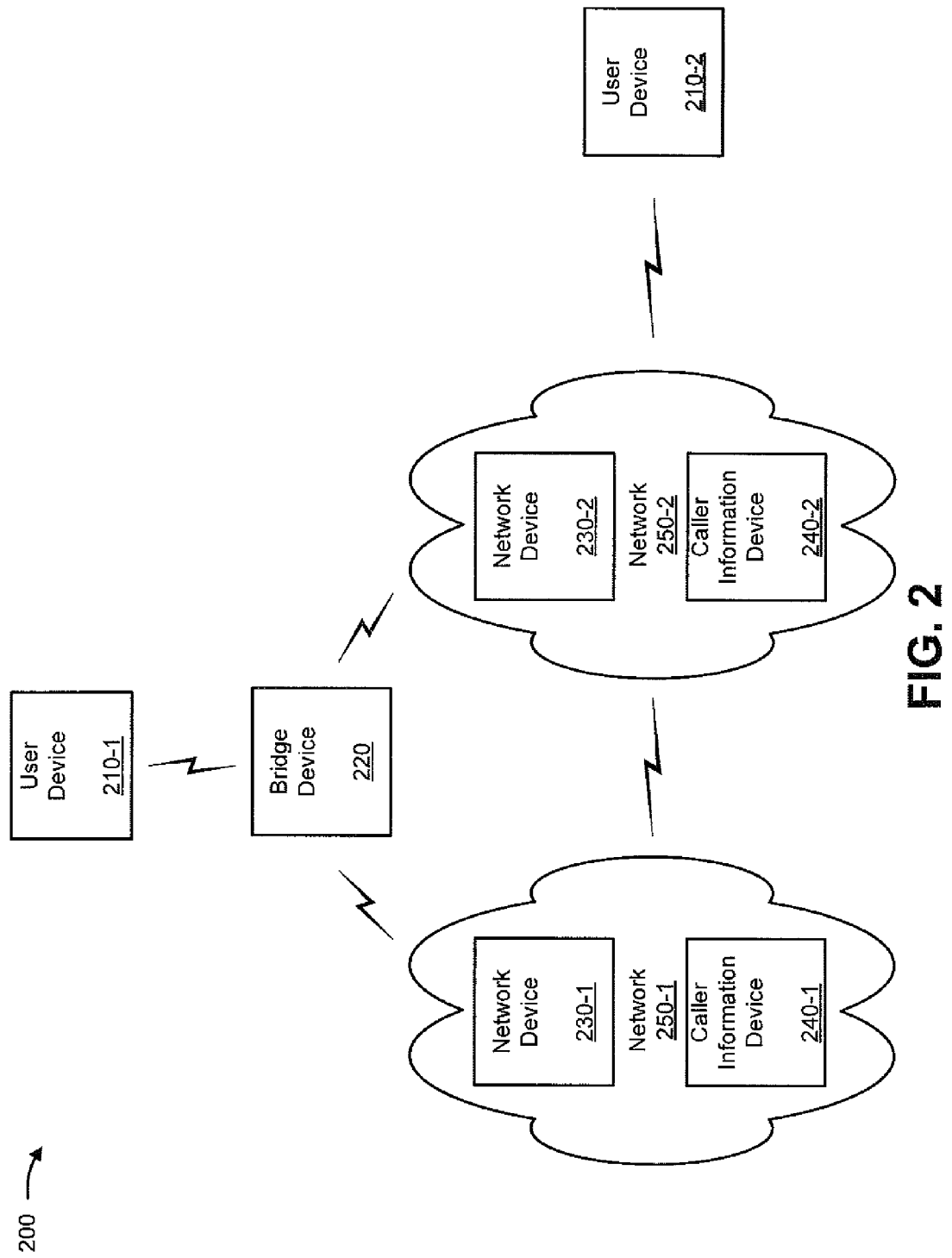

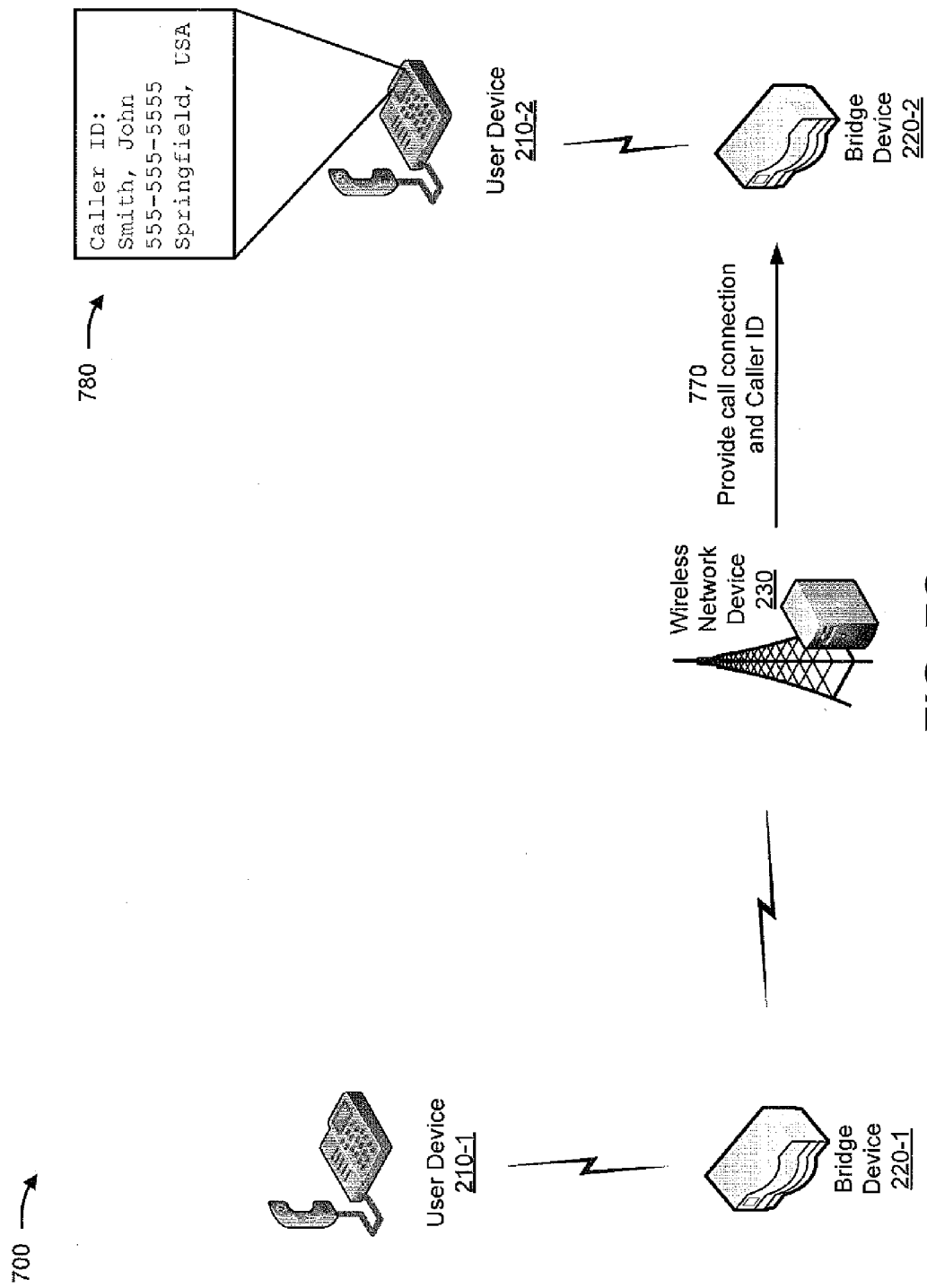

CALLER NAME IDENTIFICATION USING DATA STRUCTURE SYNCHRONIZATION OF DIFFERENT NETWORKS

RELATED APPLICATION

This application is a continuation of U.S. patent application Ser. No. 13/952,241, filed Jul. 26, 2013, the disclosure of which is incorporated herein by reference.

BACKGROUND

Wireline connections may be vulnerable to interruptions due to natural disasters, accidental wire damage, etc. A wireline user may opt to utilize a wireless connection provided by a wireless service provider, by connecting via a bridge device, while maintaining subscription service provided by the wireline service provider.

BRIEF DESCRIPTION OF THE DRAWINGS

FIG. 2 is a diagram of an example environment in which systems and/or methods described herein may be implemented;

FIGS. 7A-7C are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A wireline network service provider may provide a user device with the option to enable wireless network services (e.g., via a network collaboration agreement with a wireless network service provider) in regions where phone services are commonly interrupted, such as hurricane zones, construction areas, or the like. The user device may use a bridge device to connect legacy equipment (e.g., a wired phone) to a wireless network. A caller information device (e.g., a line information database (LIDB) device) may be used to store caller information, such as caller identification information, caller location information, or the like.

The wireline network service provider may maintain a wireline caller information device that is separate from the wireless caller information device associated with the wireless network service provider. In order to provide caller identification information, when receiving a call from the user device, the wireless network service provider may access the wireline caller identification device associated with the wired network service provider. However, querying the wireline caller identification device associated with the wireline network service provider may result in network latency and increased cost for the network service providers. Implementations described herein may assist a wireless network service provider in providing caller identification information by synchronizing the wireless caller information device associated with the wireless network service provider and the wireline caller information device associated with the wireline network service provider.

Figure 1A:
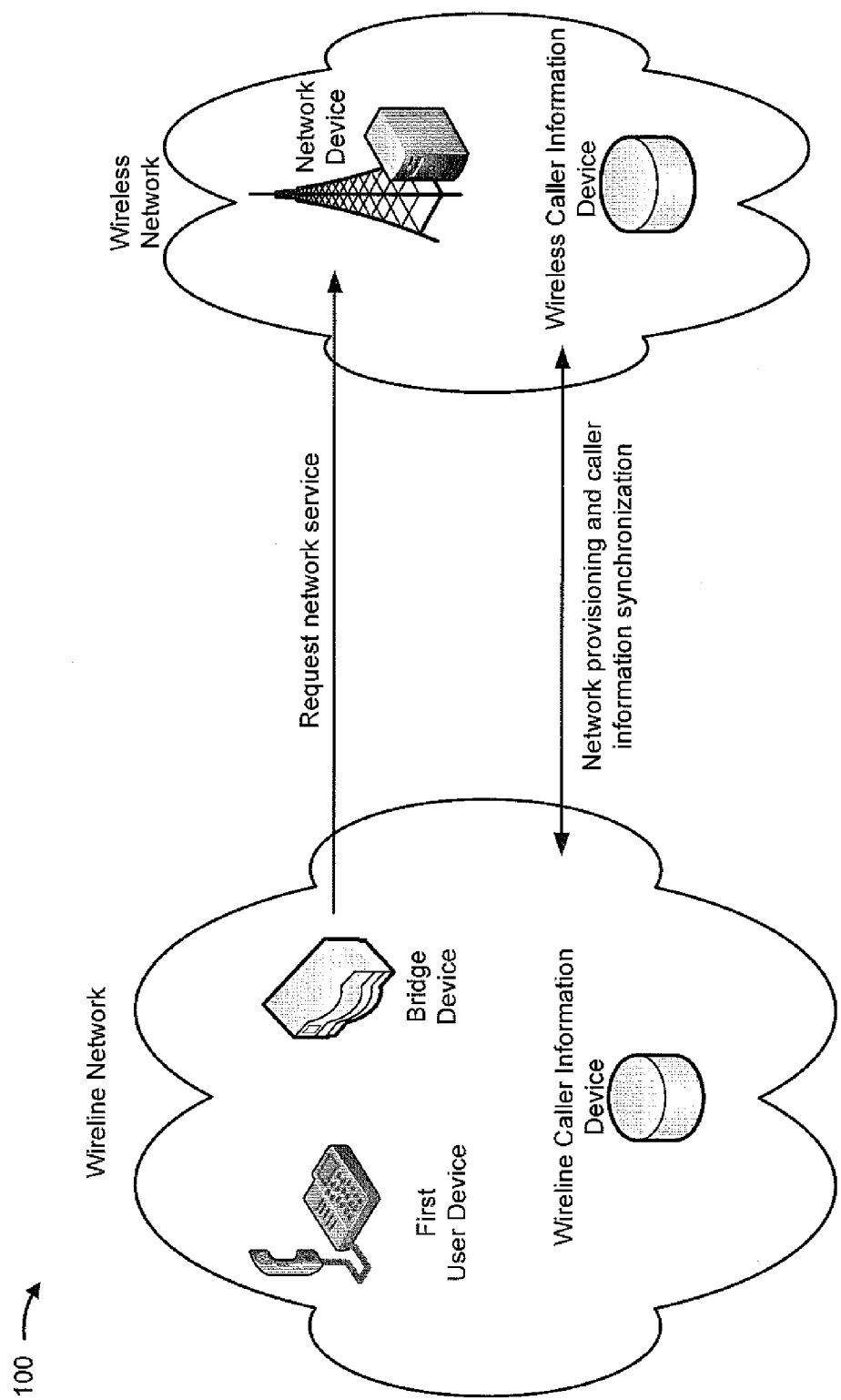
FIGS. 1A and 1B are diagrams of an overview of an example implementation described herein.
Figure 1B:
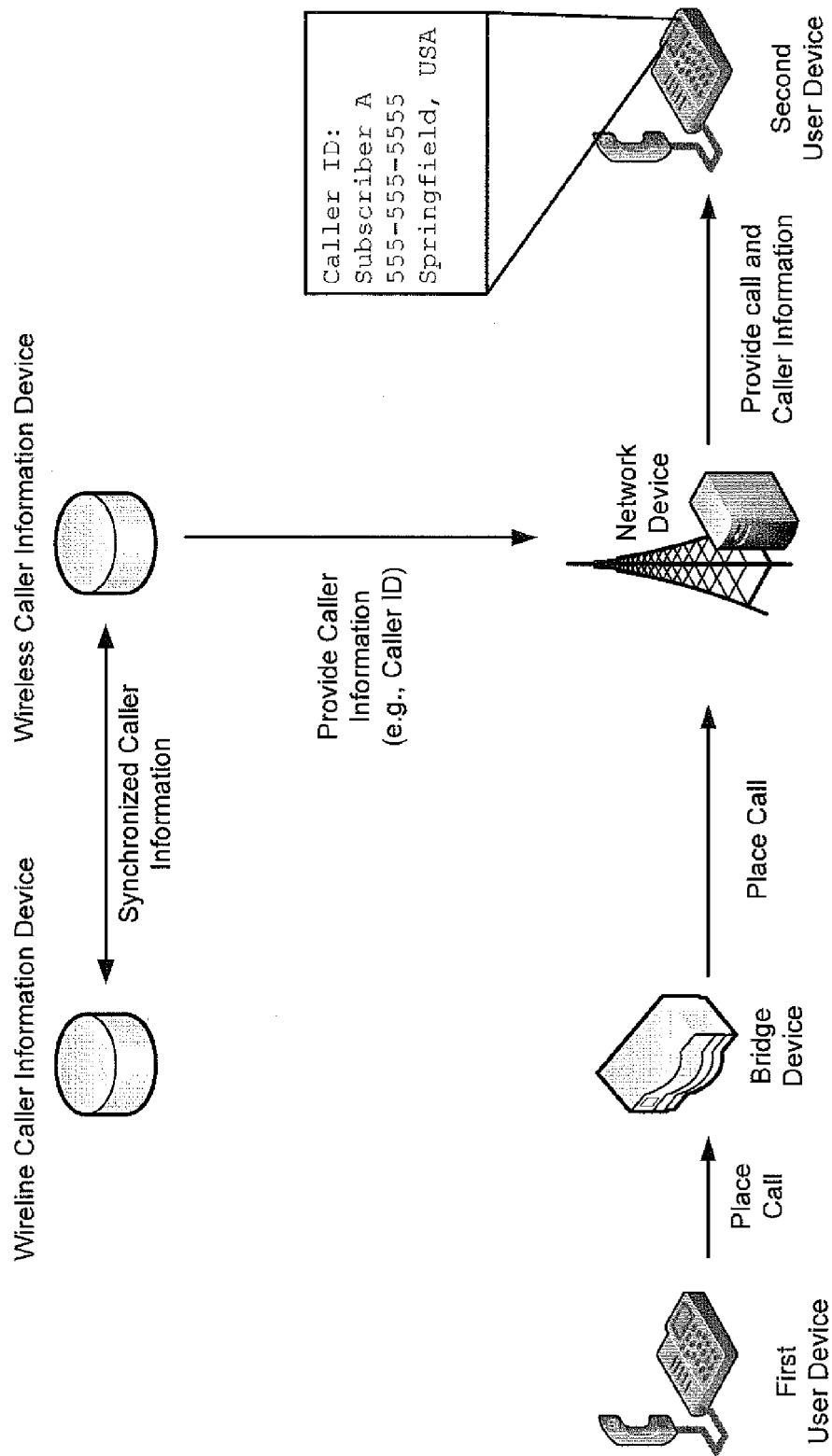

FIGS. 1A and 1B are diagrams of an overview of an example implementation 100 described herein. Example implementation 100 may include a wireline network, a first user device, a bridge device, a wireline caller information device, a wireless network, a network device, and a wireless caller information device.

As shown in FIG. 1A, the first user device, the bridge device, and the wireline caller information device may be associated with the wireline network, and the network device and the wireless caller information device may be associated with the wireless network. The network device may receive a request for a network service (e.g., wireless network service) from a user of the first user device (e.g., via the first user device, the bridge device, a network operator, another network device (not shown), etc.).

As further shown in FIG. 1A, the network device may request network provisioning and caller information synchronization from the wireline network (e.g., from a device associated with the wireline network). The wireline network may authenticate the wireless caller information device, and the wireline network and the network device may open a communication channel (e.g., a file transfer protocol (FTP) channel, a secure shell file transfer protocol (SFTP) channel, etc.) between the wireline caller information device and the wireless caller information device for caller information synchronization. The caller information synchronization may include providing caller identification information associated with the first user device to the wireless caller information device for storage. The wireline network may provide provisioning information (e.g., service information, etc.) to the network device, and the network device may enable the first user device to use the wireless network (e.g., via the bridge device).

As shown in FIG. 1B, the first user device may place a call (e.g., a phone call intended for a second user device). The call may be transmitted to the network device via the bridge device. The network device may determine that the second user device is capable of receiving caller information. The network device may query the wireless caller information device to determine caller information (e.g., caller identification information) associated with the first user device. The wireless caller information device, which is synchronized with the wireline caller information device, may provide caller information, associated with the first user device and stored during the initial caller information synchronization and/or during subsequent synchronizations, to the network device. The network device may provide the caller information (e.g., the caller name, the caller number, and/or the caller location), via the wireless network, to the second user device (e.g., for display by the second user device). In this way, caller identification information, associated with a wireline user device connecting to a wireless network via a bridge device, may be provided without requiring real-time queries to a wireline caller information device.

FIG. 2 is a diagram of an example environment 200 in which systems and/or methods described herein may be implemented. As shown in FIG. 2, environment 200 may include user devices 210-1 and 210-2 (hereinafter referred to collectively as "user devices 210," and individually as "user device 210"), a bridge device 220, network devices 230-1 and 230-2 (hereinafter referred to collectively as "network devices 230," and individually as "network device 230"), caller information devices 240-1 and 240-2 (hereinafter referred to collectively as "caller information devices 240," and individually as "caller information device 240"), and networks 250-1 and 250-2 (hereinafter referred to collectively as "networks 250," and individually as "network 250"). Devices of environment 200 may interconnect via wired connections, wireless connections, or a combination of wired and wireless connections.

User device 210 may include one or more devices capable of placing a call to, or receiving a call from, another user device 210. For example, user device 210 may include a mobile phone (e.g., a smart phone), a radiotelephone, a personal communications system (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), or a similar type of device. In some implementations, user device 210 may include a wired phone connected to a wireless network 250 via bridge device 220. In some implementations, user device 210 may include a phone (e.g., a wired phone, a wireless phone, etc.) receiving a call (e.g., via network 250) from another user device 210 that is connected to network 250 via bridge device 220. In some implementations, user device 210 may be capable of displaying caller information (e.g., caller identification information).

Bridge device 220 may include one or more devices capable of bridging network traffic between user device 210 and network 250. For example, bridge device 220 may include a network device, such as a router, a gateway, a hub, a bridge, a switch, or the like. In some implementations, bridge device 220 may connect to a wired user device 210 and provide access to network 250 (e.g., a wireless network). In some implementations, bridge device 210 may include a one times (1×) Radio Transmission Technology (RTT) device. Additionally, or alternatively, bridge device 210 may include a fixed wireless terminal.

Network device 230 may include one or more devices capable of receiving, processing, transferring and/or providing network traffic (e.g., between user devices 210) via network 250. For example, network device 230 may include a base station, a server, a router, a gateway, a hub, a bridge, a switch, or the like, capable of receiving a request for a connection from a first user device 210 to a second user device 210 (e.g., via network 250), and providing the connection. In some implementations, network device 230 may request and receive caller information (e.g., caller identification information) from caller information device 240. In some implementations, a first network device 230 may provide provisioning information, associated with user device 210, to a second network device 230.

Caller information device 240 may include one or more devices capable of receiving, generating, processing, storing, and/or providing caller information to network device 230. For example, caller information device 240 may include a server device, such as a line information database (LIDB) device, a home subscriber server (HSS), or the like, capable of storing and/or providing caller information associated with user device 210. In some implementations, caller information device 240 may be associated with network 250 and/or network device 230. In some implementations, a first caller information device 240 may provide stored caller information to a second caller information device 240 (e.g., by synchronizing with second caller information device 240).

Network 250 may include one or more wired and/or wireless networks. For example, network 250 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, network 250 may include one or more connections between user device 210, bridge device 220, network device 230, and/or caller information device 240. In some implementations, network 250 may be associated with network device 230 and/or a network service provider.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while network device 230 and caller information device 240 are shown as separate devices, network device 230 and caller information device 240 may be implemented in a single device. Additionally, one or more of the devices of environment 200 may perform one or more functions described as being performed by another one or more devices of environment 200.

Figure 3:
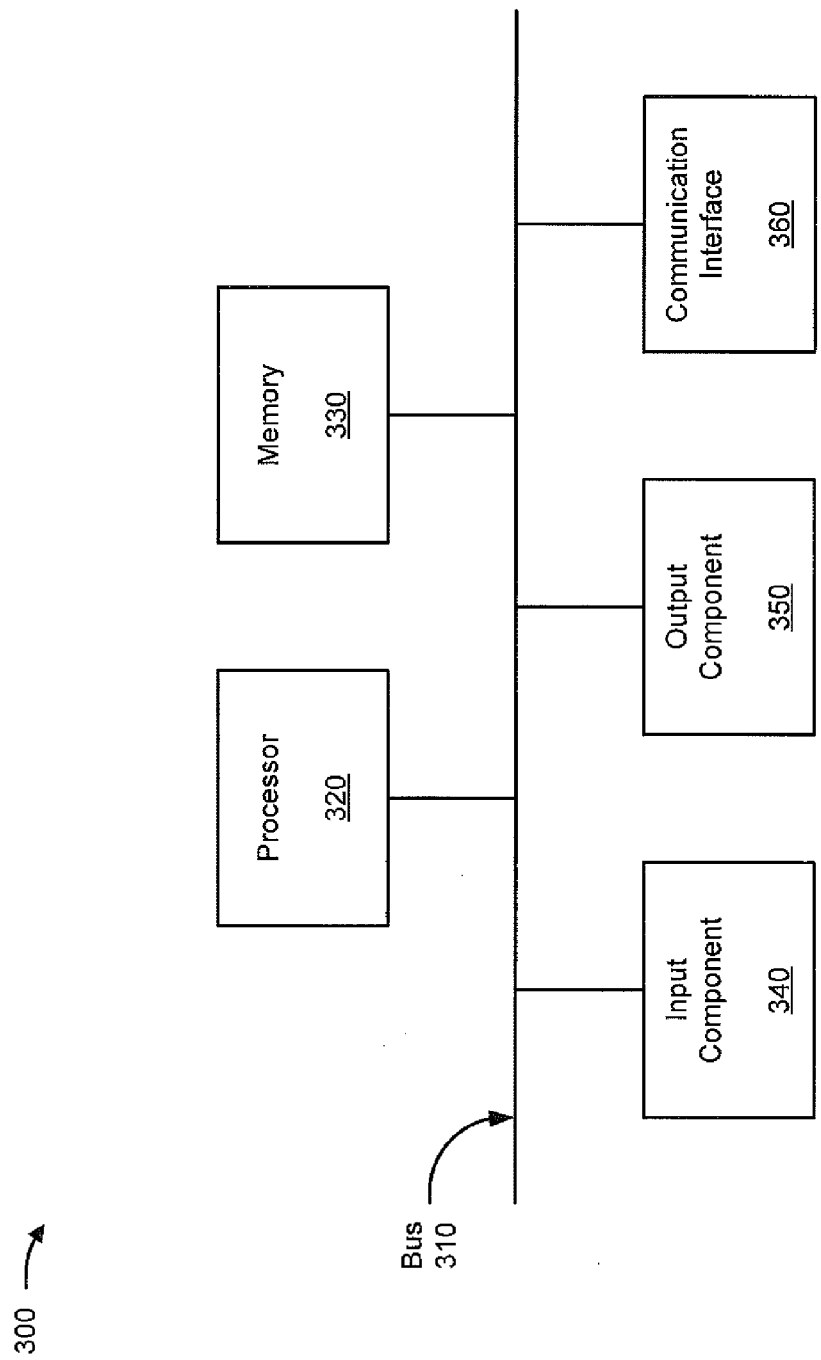
FIG. 3 is a diagram of example components of one or more devices of FIG. 2.

FIG. 3 is a diagram of example components of a device 300. Device 300 may correspond to user device 210, bridge device 220, network device 230, and/or caller information device 240. In some implementations, each of user device 210, bridge device 220, network device 230, and/or caller information device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
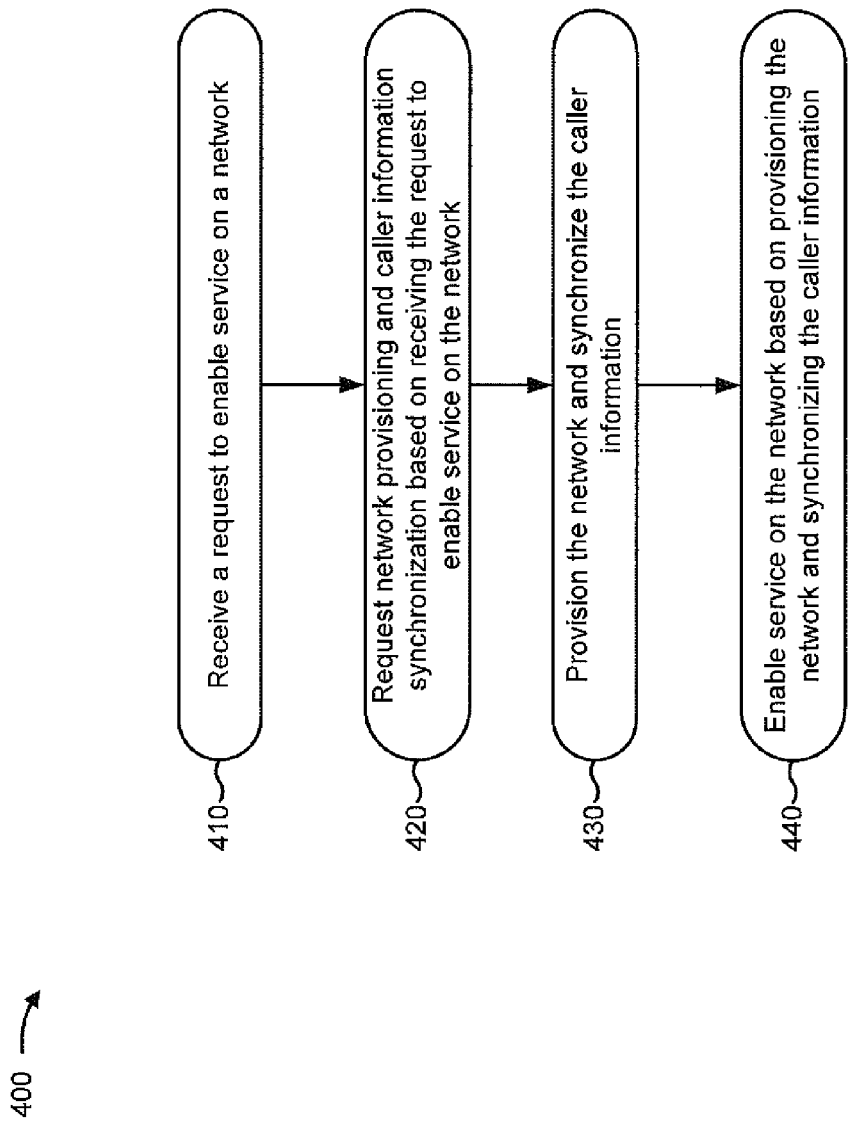
FIG. 4 is a flow chart of an example process for synchronizing caller information for wireline user devices using a wireless network.

FIG. 4 is a flow chart of an example process 400 for synchronizing caller information for wireline user devices using a wireless network. In some implementations, one or more process blocks of FIG. 4 may be performed by network device 230. Additionally, or alternatively, one or more process blocks of FIG. 4 may be performed by another device or a group of devices separate from or including network device 230, such as user device 210, bridge device 220, and/or caller information device 240.

As shown in FIG. 4, process 400 may include receiving a request to enable service on a network (block 410). For example, a first network device 230 may receive a request, from user device 210, to enable service on a first network 250. In this case, user device 210 may be associated with a second network 250 that includes a second network device 230. In some implementations, the request to enable service on first network 250 may be received via bridge device 220, via second network device 230, etc. In some implementations, the request to enable service may be a request for a type of access, such as permanent access to first network 250, temporary access to first network 250 (e.g., selective access), backup access to first network 250 (e.g., emergency access), or the like. Enabling network service may refer to subscribing user device 210 to first network 250, and providing the ability to access the network. Access may include an ability, by user device 210, to place a call (e.g., a phone call, a voice-over internet protocol (VOIP) call, etc.), to transfer data (e.g., via dial-up internet access), etc., via first network 250.

First network 250 may include a wireless network, in some implementations. For example, in locations where wireline telephony is unreliable, user device 210 may request backup service enablement on a wireless network. In this case, second network 250 may include a wireline network (e.g., a PSTN). In some implementations, second network 250 may be associated with a wireline network service provider for user device 210, and may have a service agreement with a wireless network service provider, associated with first network 250, permitting user devices 210 to receive network service associated with (e.g., to connect to) first network 250 while maintaining subscriber services from the wireline network service provider. Subscriber services may include administrative services, such as billing service, customer service, phone number localization service, a service plan (e.g., a number of minutes allowed, etc.), or the like.

The request to enable service on first network 250 may include information associated with approving the service enablement request, in some implementations. For example, a user of user device 210 may provide authentication information (e.g., information identifying a subscriber, information identifying user device 210, information identifying a service provider network, etc.), authorization information (e.g., an indication that the user is authorized to request service enablement), etc.

As further shown in FIG. 4, process 400 may include requesting network provisioning and caller information synchronization based on receiving the request to enable service on the network (block 420). For example, first network device 230, associated with first network 250, may request network provisioning and caller information synchronization, from second network device 230, associated with second network 250. Provisioning information may include information used in providing network service enablement and/or network access, such as invoicing information, user support information, network connectivity information, user priority class information, or the like. Caller information synchronization may include providing caller information to a first caller information device 240, associated with first network 250, from a second caller information device 240, associated with second network 250.

For example, when user device 210 (e.g., a user device associated with a wireline network) is requesting enablement of service on a wireless network, caller information stored on wireline caller information device 240 (e.g., a caller information device associated with the wireline network) may be provided to wireless caller information device 240 (e.g., a caller information device associated with the wireless network). Caller information may include information associated with identifying a caller, such as caller name identification (CNAM) information, caller identification (ID) information, calling line identification (CLID) information, calling number identification (CNID) information, or the like.

As further shown in FIG. 4, process 400 may include provisioning the network and synchronizing the caller information (block 430). For example, first network device 230 may receive provisioning information from second network device 230, and may confirm that first caller information device 240 has been synchronized with second caller information device 240.

Synchronizing the caller information may include transferring information from second caller information device 240 (e.g., a caller information device associated with a wireline network) to first caller information device 240 (e.g., a caller information device associated with a wireless network). In some implementations, second network device 230 may provide authentication information to first network device 230. The authentication information may include information identifying a collaboration agreement (e.g., an agreement to allow synchronization between caller information devices 240), such as a pre-configured collaboration agreement, a real-time agreement (e.g., an agreement created in response to the request to enable network service), or the like. In some implementations, first network device 230 may set up a communication channel between first caller information device 240 and second caller information device 240. A communication channel may include a connection for transferring caller information, such as an FTP connection, an SFTP connection, an FTP over Secure Shell (FTP over SSH) connection, a hypertext transfer protocol (HTTP) connection, or the like. In some implementations, the transfer may include duplication of caller information (e.g., providing a copy of the caller information).

The transfer of caller information (e.g., synchronizing a data structure, associated with wireline caller information device 240, and another data structure, associated with wireless caller information device 240) may be based on a single request to enable service on first network 250, in some implementations. For example, first network device 230 may set up the transfer of caller information for each request to enable network service. Additionally, or alternatively, first network device 230 may initiate a transfer based on a threshold quantity of requests to enable service on first network 250 (e.g., from a threshold quantity of user devices). In this case, first network device 230 may store an indication of the request to enable service on first network 250, and may synchronize caller information when the threshold is satisfied. Additionally, or alternatively, first network device 230 may initiate a transfer based on a pre-configured time. In this case, first network device 230 may synchronize caller information at a particular time and/or after a particular time interval (e.g., once per day, once per week, etc.).

As further shown in FIG. 4, process 400 may include enabling service on the network based on provisioning the network and synchronizing the caller information (block 440). For example, first network device 230 may enable service on first network 250 for user device 210 (e.g., via bridge device 220). In some implementations, user device 210 may be disconnected from second network device 230 (e.g., by being disconnected from second network 250). In some implementations, first network device 230 may provide an indication that user device 210 has been connected to first network 250. For example, first network device 230 may provide an indication via bridge device 220 that network service is enabled.

In this way, a user device (e.g., a wireline user device) may be connected to a wireless network (e.g., via a bridge device), and provisioning information and caller information may be synchronized to the wireless network from the wireline network to support providing caller identification information to other user devices.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
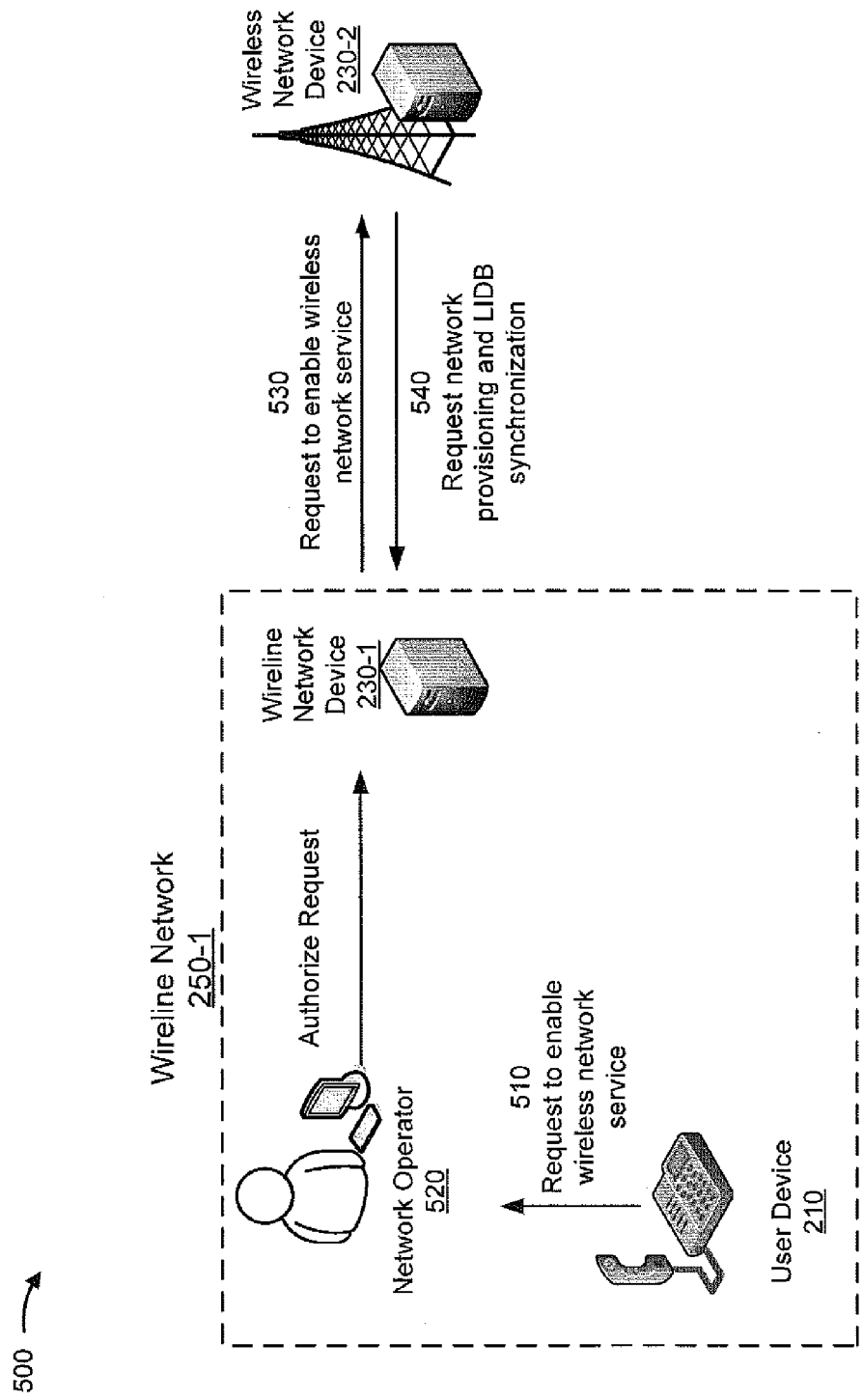
FIGS. 5A and 5B are diagrams of an example implementation relating to the example process shown in FIG. 4.
Figure 5B:
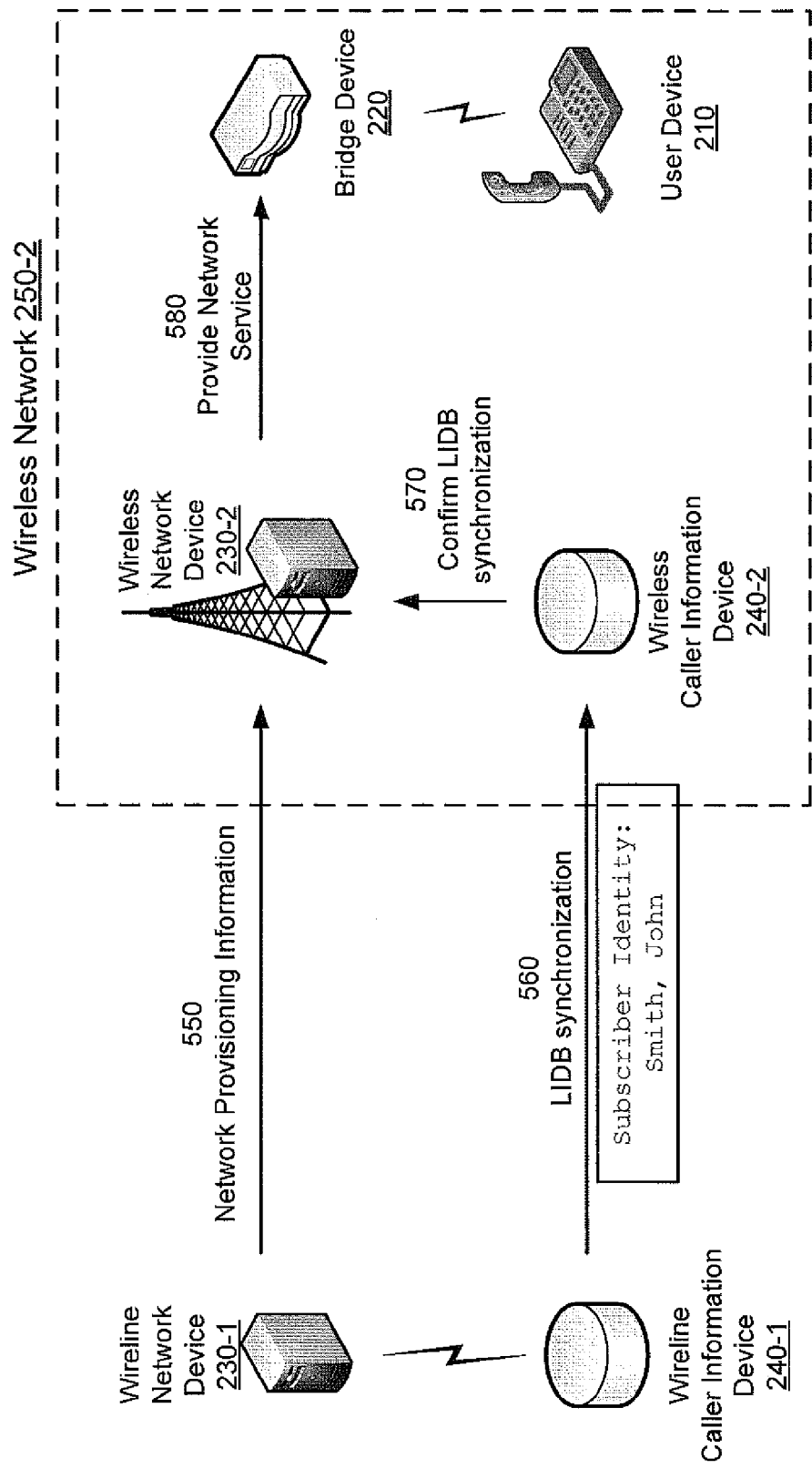

FIGS. 5A and 5B are diagrams of an example implementation 500 relating to process 400 shown in FIG. 4. As shown in FIG. 5A, example implementation 500 may include wireline network 250-1, user device 210, wireline network device 230-1, and wireless network device 230-2 (e.g., connected to wireless network 250-2, not shown). Assume that user device 210 and wireline network device 230-1 are associated with wireline network 250-1. As shown by reference number 510, a user of user device 210 transmits a request, to enable wireless network service on wireless network 250-2, to network operator 520 (e.g., a customer service representative representing a wireline network service provider associated with wireline network 250-1). As shown by reference number 520, network operator 520 provides authorization of the request to wireline network device 230-1. As shown by reference number 530, wireline network device 230-1 provides the request to wireless network device 230-2. As shown by reference number 540, wireless network device 230-2 requests network provisioning and requests caller information synchronization with wireless caller information device 240-2 (e.g., a device including access to an LIDB).

As shown in FIG. 5B, and by reference number 550, wireline network device 230-1 provides the network provisioning information to wireless network device 230-2. As shown by reference number 560, wireline caller information device 240-1 synchronizes LIDBs with wireless caller information device 240-2 (e.g., provides caller information from a wireline LIDB to a wireless LIDB). For example, wireline caller information device 240-1 provides caller information (e.g., "Subscriber Identity: Smith, John") to wireless caller information device 240-2. As shown by reference number 570, wireless caller information device 240-2 confirms LIDB synchronization to wireless network device 230-2. As shown by reference number 580, wireless network device 230-2 enables network service for user device 210 on wireless network 250-2 via bridge device 220.

As indicated above, FIGS. 5A and 5B are provided merely as an example. Other examples are possible and may differ from what was described with regard to FIGS. 5A and 5B.

Figure 6:
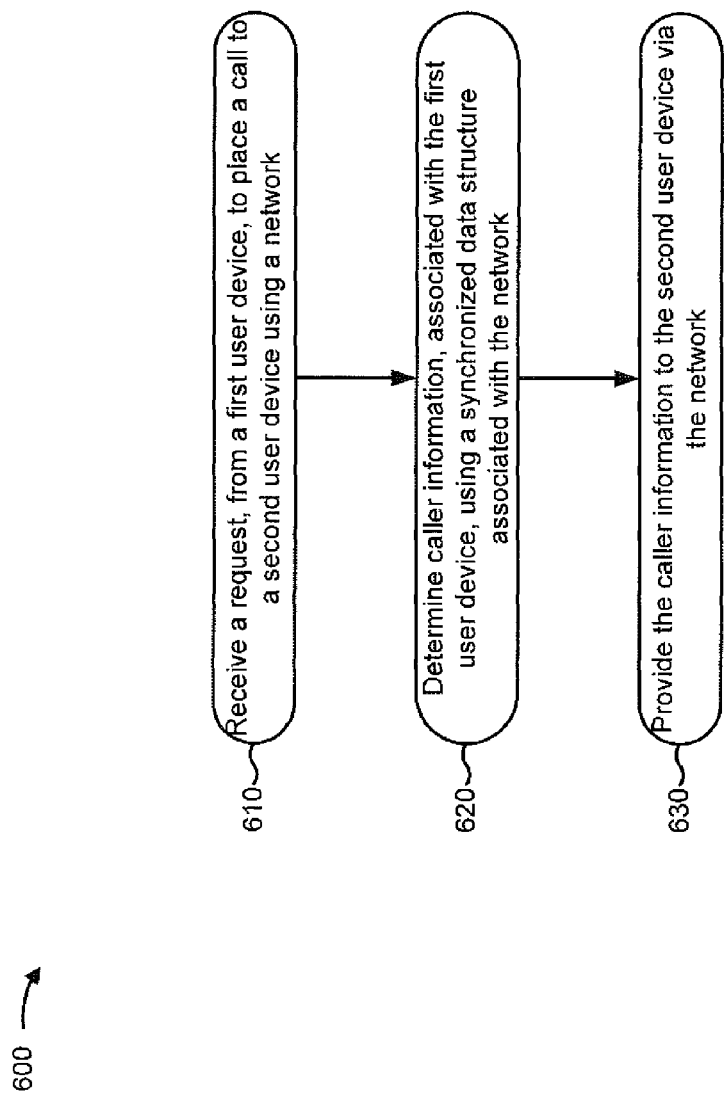
FIG. 6 is a flow chart of an example process for providing caller name identification, of wireline user devices using a wireless network, using a synchronized data structure.

FIG. 6 is a flow chart of an example process 600 for providing caller name identification, of wireline user devices using a wireless network, using a synchronized data structure. In some implementations, one or more process blocks of FIG. 6 may be performed by network device 230. Additionally, or alternatively, one or more process blocks of FIG. 6 may be performed by another device or a group of devices separate from or including network device 230, such as user device 210, bridge device 220, and/or caller information device 240.

As shown in FIG. 6, process 600 may include receiving a request, from a first user device, to place a call to a second user device using a network (block 610). For example, network device 230 may receive a request from first user device 210 (e.g., via bridge device 220) to place a call to second user device 210 using network 250. A call may refer to a connection between first user device 210 and second user device 210, such as for a phone call, a data transfer, or the like. In some implementations, second user device 210 may be connected to network 250 via a second bridge device 220. In some implementations, the request may be for a connection to multiple user devices 210 (e.g., for a group call, a conference call, etc.).

As further shown in FIG. 6, process 600 may include determining caller information, associated with the first user device, using a synchronized data structure associated with the network (block 620). For example, network device 230 may query caller information device 240 to receive caller information, from a synchronized LIDB, associated with first user device 210. In some implementations, network device 230 may determine caller information associated with first user device 210 based on determining that second user device 210 is capable of receiving the caller information. For example, network device 230 may query a subscriber information data structure (e.g., an HSS) to determine the caller information reception capability of second user device 210.

Determining caller information may include receiving caller information from caller information device 240, in some implementations. For example, network device 230 may query caller information device 240 (e.g., via a service request message) for caller information. In some implementations, network device 230 may send an identifier of first user device 210. For example, network device 230 may provide information identifying first user device 210, such as a phone number, a mobile device identifier, a Universal Resource Indicator (URI), a Universal Resource Locator (URL), an Internet Protocol (IP) address, or the like.

Caller information device 240 may determine caller information based on the information identifying first user device 210, in some implementations. For example, caller information device 240 may map the user device identifier to provisioning information to determine that first user device 210 is a wireline subscriber that is subscribed to wireless service associated with network 250. In this case, caller information device 240 may query a synchronized data structure that is associated with caller information device 240, to determine caller information associated with first user device 210, and may provide the caller information to network device 230. In some implementations, the synchronized data structure may be an LIDB, associated with network 250, which is synchronized with another LIDB, which is associated with another network. For example, a first LIDB, associated with network 250, may be synchronized with a second LIDB, associated with the subscriber service provider of first user device 210, as described herein in connection with FIG. 4. In this case, caller information device 240 may access caller information associated with first user device 210 by querying the first LIDB, and without needing to query the second LIDB.

As further shown in FIG. 6, process 600 may include providing the caller information to the second user device via the network (block 630). For example, network device 230 may provide the caller information (e.g., caller ID information) to second user device 210, via network 250, for display. In some implementations, the caller information may be provided as part of connecting the call to second user device 210.

In this way, a first network service provider, providing a first network service to a first user device associated with a second service provider, may provide caller information associated with the first user device to a second user device concurrently with call connection, without querying a data structure associated with the second service provider.

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
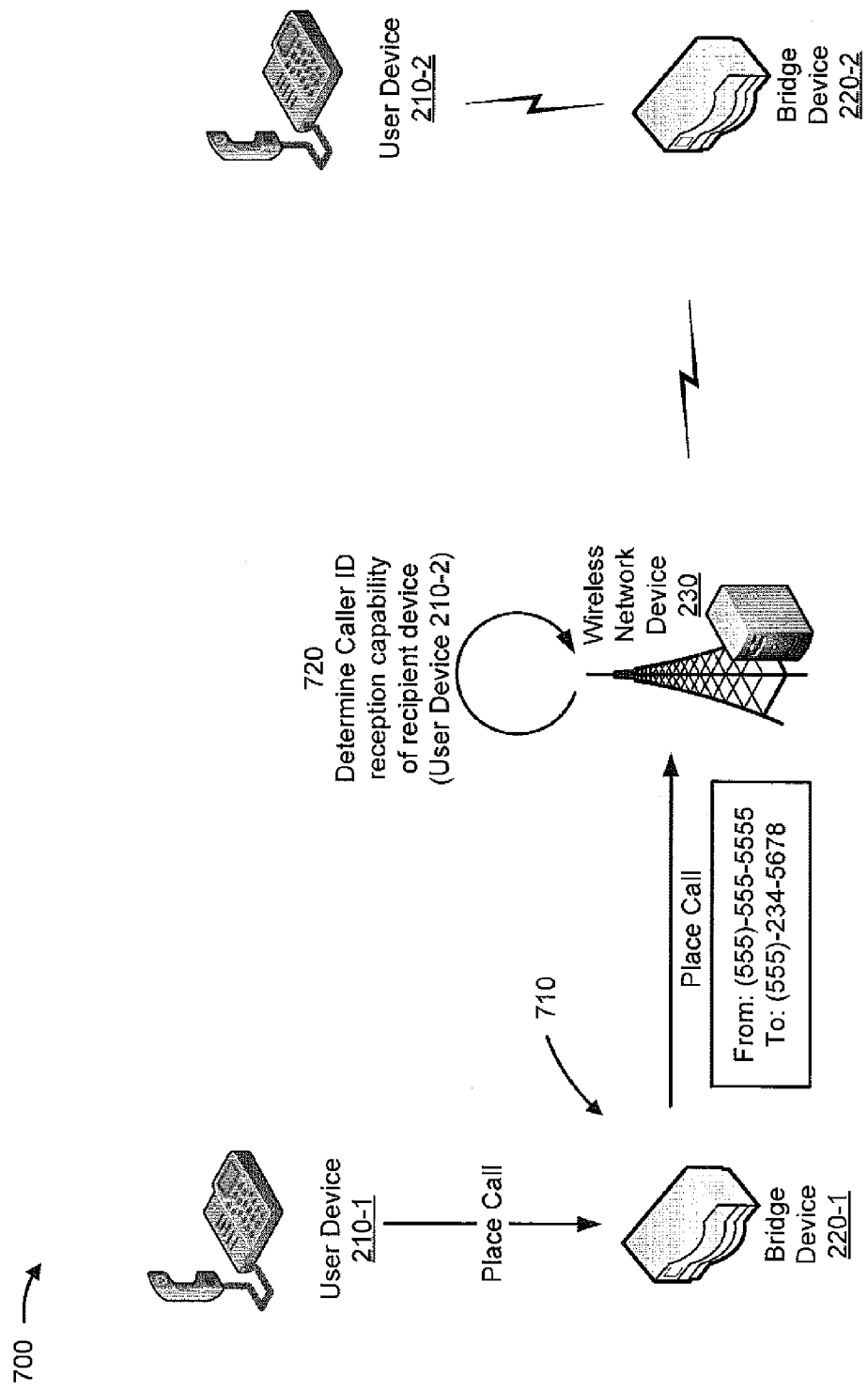
Figure 7B:
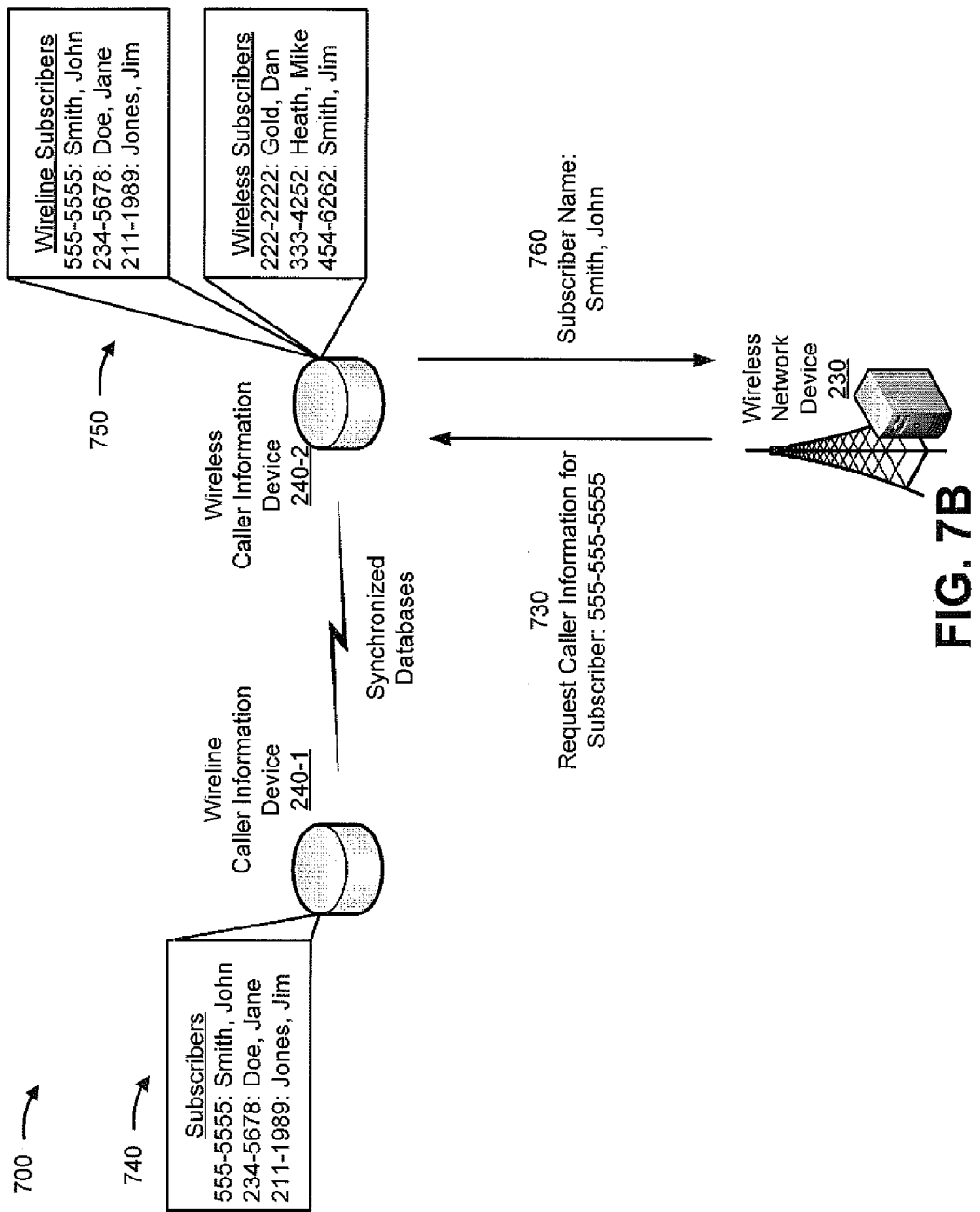

FIGS. 7A-7C are diagrams of an example implementation 700 relating to process 600 shown in FIG. 6. As shown in FIG. 7A, example implementation 700 includes user device 210-1, bridge device 220-1, wireless network device 230 (e.g., associated with wireless network 250, not shown), bridge device 220-2, and user device 210-2. As shown by reference number 710, user device 210-1 places a call via bridge device 220-1. The request for the call to be connected (e.g., by wireless network device 230) includes information identifying the caller (e.g., "From: (555)-555-5555") and the recipient (e.g., "To: (555)-234-5678"). Assume that user device 210-1 is the caller (e.g., "(555)-555-5555") and user device 210-2 is the recipient (e.g., "(555)-234-5678"). As shown by reference number 720, wireless network device 230 determines that the recipient device, user device 210-2, is capable of receiving a caller ID (e.g., a phone number of user device 210-1; a name of a user associated with user device 210-1; a location associated with user device 210-1, which may be provided by another network device; etc.).

As shown in FIG. 7B, and by reference number 730, wireless network device 230 requests caller information (e.g., a caller ID) associated with user device 210-1. Wireless network device 230 provides the phone number associated with user device 210-1 to caller information device 240-2 (e.g., a caller information device associated with wireless network device 230 and network 250). Assume that wireline caller information device 240-1 is associated with a wireline network service provider that provides subscriber services to user device 210-1, and that user device 210-1 is also subscribed to a wireless network service provider (e.g., associated with wireless network device 230 and wireless network 250) for placing calls.

As shown by reference number 740, wireline caller information device 240-1 includes a data structure storing subscriber information that has been pre-synchronized with wireless caller information device 240-2, as discussed herein in connection with FIG. 4. As shown by reference number 750, wireless caller information device 240-2 includes a database of information identifying wireline subscribers, synchronized from wireline caller information device 240-1, as well as wireless subscribers (e.g., for whom the wireless network service provider provides both network services and subscriber services). Wireless caller information device 240-2 determines that user device 210-1 is a wireline subscriber and searches for caller information, associated with user device 210-1, within wireless caller information device 240-2 (e.g., without querying wireline caller information device 240-1 at the time of the call). As shown by reference number 760, wireless caller information device 240-2 provides a caller ID (e.g., "Subscriber Name: Smith, John") to wireless network device 230.

As shown in FIG. 7C, and by reference number 770, wireless network device 230 connects user device 210-1 (e.g., via bridge device 220-1) to user device 210-2 (e.g., via bridge device 220-2), and provides the caller ID to user device 210-2. As shown by reference number 780, user device 210-2 displays the caller ID to identify user device 210-1 to a user of user device 210-2.

As indicated above, FIGS. 7A-7C are provided merely as an example. Other examples are possible and may differ from what was described with regard to FIGS. 7A-7C.

Implementations described herein may allow a wireless network device associated with a wireless network to pre-synchronize caller information from a wireline data structure associated with a wireline network to a wireless data structure associated with the wireless network. Implementations described herein may further provide caller information identifying a first user device, associated with the wireline network but making a call via the wireless network, to a second user device, via the wireless network, by querying the wireless data structure and without querying the wireline data structure when the call is being made.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive a request to enable service, on a first network, for a user device,
         the user device being associated with a second network,
            the second network being a different type of network than the first network;
      request network provisioning information associated with the second network;
      provision the first network based on the request for network provisioning information associated with the second network;
      synchronize caller information to a first caller information device, associated with the first network, from a second caller information device, associated with the second network,
         the caller information including caller identification information; and
      enable the service, for the user device, on the first network based on provisioning the first network and synchronizing the caller information to the first caller information device from the second caller information device.

2. The device of claim 1, where the user device is a first user device; and
   where the one or more processors are further to:
      receive a request from the first user device to place a call using the first network,
         the call being intended for a second user device;
      determine caller information associated with the first user device,
         the caller information being retrieved from the first caller information device; and
      provide the caller information to the second user device.

3. The device of claim 2, where the one or more processors, when providing the caller information to the second user device, are further to:
   provide the caller information, to the second user device, for display by the second user device.

4. The device of claim 2, where the one or more processors are further to:
   provide information identifying the first user device to the first caller information device,
      the first caller information device including a data structure storing caller information,
      the data structure having been previously synchronized with the second caller information device to receive the information identifying the first user device; and
   receive caller information, associated with the first user device, from the first caller information device based on providing the information identifying the first user device to the first caller information device; and
   where the one or more processors, when determining the caller information associated with the first user device, are further to:
      determine the caller information associated with the first user device based on receiving the caller information from the first caller information device.

5. The device of claim 2, where the second user device is a wireless device.

6. The device of claim 2, where the second user device is a wireline device.

7. The device of claim 1, where the one or more processors, when synchronizing the caller information, are further to:
   provide authentication information to the second network;
   determine that authentication has been established;
   establish a communication channel between the first caller information device and the second caller information device based on determining that authentication has been established;
   receive the caller information from the second caller information device via the communication channel; and
   store the caller information using the first caller information device.

8. The device of claim 1, where the one or more processors, when receiving the request to enable service on the first network, are further to:
   receive a plurality of requests to enable service on the first network,
      the plurality of requests including the request; and
   where the one or more processors, when requesting the network provisioning information associated with the second network, are further to:
      determine a quantity of requests included in the plurality of requests;
      determine that the quantity of requests satisfies a threshold; and
      request the network provisioning information based on determining that the quantity of requests satisfies the threshold.

9. A computer-readable medium storing instructions, the instructions comprising:
   one or more instructions that, when executed by one or more processors, cause the one or more processors to:
      receive a request to enable network service, for a user device, on a first network, the user device being associated with a second network and being capable of connecting to the first network,
the second network being different from the first network;
query a network device, associated with the second network, for configuration information associated with enabling network service for the user device on the first network;
request that caller information, associated with the user device, be transferred to a first caller information device, associated with the first network, from a second caller information device associated with the second network;
receive, from the first caller information device, confirmation that the caller information has been transferred from the second caller information device to the first caller information device,
the confirmation indicating that the first caller information device has been synchronized with caller information stored by the second caller information device; and
enable the network service on the first network for the user device based on querying the second network device for configuration information and receiving confirmation that the caller information has been transferred from the second caller information device to the first caller information device.

10. The computer-readable medium of claim 9, where the user device is a first user device; and
where the one or more instructions, when executed by the one or more processors, further cause the one or more processors to:
receive a request, from the first user device, for a connection to be made to a second user device via the first network;
determine caller identification (ID) information, associated with the first user device, using the first caller information device; and
provide the caller ID information to the second user device.

11. The computer-readable medium of claim 10, where the second user device includes a wireline device.

12. The computer-readable medium of claim 9, where the one or more instructions, that cause the one or more processors to enable the network service on the first network for the user device, further cause the one or more processors to:
subscribe the user device to the first network; and
permit the user device to place a call using the first network.

13. The computer-readable medium of claim 9, where the first network is a first type of network; and
where the second network is a second type of network,
the second type of network being different from the first type of network.

14. The computer-readable medium of claim 9, where the one or more instructions, when executed by the one or more processors, further cause the one or more processors to:
determine that the caller information is out of synchronization; and
where the one or more instructions, that cause the one or more processors to request that the caller information be transferred to the first caller information device, further cause the one or more processors to:
request that the caller information be transferred to the first caller information device based on determining that the caller information is out of synchronization.

15. A method, comprising:
receiving, by a network device associated with a first network service provider, a request to enable network service, for a first user device, on a network,
the first user device being associated with a second network service provider;
receiving, by the network device, network provisioning information associated with enabling network service, for the first user device, on the network;
requesting, by the network device, that a first data structure, associated with a first caller information device, be synchronized with a second data structure associated with a second caller information device,
the first caller information device being associated with the first network service provider,
the second caller information device being associated with the second network service provider;
receiving, by the network device, confirmation that the first data structure and the second data structure have been synchronized;
enabling, by the network device, network service on the network for the first user device based on receiving the network provisioning information and receiving the confirmation that the first data structure and the second data structure have been synchronized;
receiving, by the network device, a request for a call to be placed from the first user device to a second user device using the network;
querying, by the network device, the first data structure for caller information associated with the first user device; and
providing, by the network device, the caller information to the second user device based on querying the first data structure.

16. The method of claim 15, where the first user device is a wireless user device; and
where the second user device is a wireline user device.

17. The method of claim 15, where the network is one of:
a wireless network, or
a wired network.

18. The method of claim 15, where providing the caller information to the second user device further comprises:
determining that the second user device is capable of receiving the caller information; and
providing the caller information to the second user device based on determining that the second user device is capable of receiving the caller information.

19. The method of claim 15, where the first network service provider and the second network service provider are associated with different types of networks.

20. The method of claim 15, where enabling network service on the network further comprises:
permitting the first user device to place the call using the network.

* * * * *